US012384662B2

(12) United States Patent
Miyazaki

(10) Patent No.: US 12,384,662 B2
(45) Date of Patent: Aug. 12, 2025

(54) CRANE

(71) Applicant: SUMITOMO HEAVY INDUSTRIES CONSTRUCTION CRANES CO., LTD., Tokyo (JP)

(72) Inventor: Tadashi Miyazaki, Aichi (JP)

(73) Assignee: SUMITOMO HEAVY INDUSTRIES CONSTRUCTION CRANES CO., LTD., Tokyo (JP)

( * ) Notice: Subject to any disclaimer, the term of this patent is extended or adjusted under 35 U.S.C. 154(b) by 615 days.

(21) Appl. No.: 17/707,185

(22) Filed: Mar. 29, 2022

(65) Prior Publication Data

US 2022/0315390 A1 Oct. 6, 2022

(30) Foreign Application Priority Data

Mar. 30, 2021 (JP) ................................ 2021-058069

(51) Int. Cl.

*B66C 13/18* (2006.01)
*B66C 13/56* (2006.01)
*B66C 23/00* (2006.01)
*B66C 23/36* (2006.01)
*B66C 23/86* (2006.01)
*B66C 23/88* (2006.01)

(52) U.S. Cl.

CPC .............. *B66C 13/18* (2013.01); *B66C 13/56* (2013.01); *B66C 23/36* (2013.01); *B66C 23/54* (2013.01); *B66C 23/86* (2013.01); *B66C 23/88* (2013.01); *B66C 2700/0371* (2013.01)

(58) Field of Classification Search

CPC ......... B66C 13/00; B66C 13/18; B66C 13/20; B66C 13/56

See application file for complete search history.

(56) References Cited

U.S. PATENT DOCUMENTS

| | | | | |
|---|---|---|---|---|
| 4,023,636 | A * | 5/1977 | Levin | B62D 11/02 74/471 XY |
| 8,353,185 | B2 * | 1/2013 | Yuhi | B62H 5/02 70/252 |
| 10,088,915 | B2 * | 10/2018 | Drum | G06F 3/0338 |
| 10,633,022 | B2 * | 4/2020 | Johnson | G05G 9/047 |
| 11,828,043 | B2 * | 11/2023 | Fredrickson | G05G 9/04785 |
| 2010/0236304 | A1 * | 9/2010 | Yuhi | B62H 5/02 70/224 |
| 2019/0284028 | A1 * | 9/2019 | Matsushita | B66D 1/08 |
| 2019/0359257 | A1 * | 11/2019 | Johnson | B62D 55/06 |
| 2022/0195697 | A1 * | 6/2022 | Fredrickson | E02F 9/2004 |

FOREIGN PATENT DOCUMENTS

JP 2016-102017 A 6/2016

* cited by examiner

*Primary Examiner* — Anna M Momper
*Assistant Examiner* — Juan J Campos, Jr.
(74) *Attorney, Agent, or Firm* — Michael Best & Friedrich LLP

(57) ABSTRACT

Provides is a crane in which the manipulation according to an operator's intention is more easily performed. The crane includes a manipulating member capable of performing at least one of an accelerator manipulation for increasing or decreasing a rotational speed of an engine and a turning manipulation of a turning body. A predetermined operation is stopped in a case where an operator is not touching the manipulating member and the predetermined operation (turning operation, traveling operation, or the like) of the crane is performed.

18 Claims, 9 Drawing Sheets

CRANE

RELATED APPLICATIONS

The content of Japanese Patent Application No. 2021-058069, on the basis of which priority benefits are claimed in an accompanying application data sheet, is in its entirety incorporated herein by reference.

BACKGROUND

Technical Field

Certain embodiment of the present invention relates to a crane.

Description of Related Art

Generally, the operation of a crane is complicated and difficult because it is necessary to simultaneously perform various manipulations such as hoisting/lowering a winch, turning, boom derricking, and traveling (refer to the related art).

SUMMARY

According to an embodiment of the present invention, there is provided a crane including a manipulating member capable of performing at least one of an accelerator manipulation for increasing or decreasing a rotational speed of an engine and a turning manipulation of a turning body, and in a case where an operator is not touching the manipulating member and a predetermined operation of the crane is being performed, the predetermined operation is stopped.

DETAILED DESCRIPTION

Since the operation of the crane is complicated and difficult in this way, a crane in which the manipulation according to an operator's intention is easily manipulated is demanded.

Thus, it is desirable to provide a crane in which the manipulation according to an operator's intention is more easily performed.

In addition, in the present invention, the manipulating member includes not only a configuration in which a member for performing the accelerator manipulation and a member for performing the turning manipulation are separate but also a configuration in which the members are integrated with each other. Additionally, the predetermined operation of the crane includes, for example, a turning operation of the turning body, a traveling operation of an undercarriage, and a rotational operation of a winch (a winding or unwinding operation of a rope). Thus, the present invention includes, for example, stopping the turning operation in a case where an operator is not touching the manipulating member and the turning operation of the crane is performed. Additionally, the present invention includes, for example, stopping the traveling operation in a case where an operator is not touching the manipulating member and the traveling operation of the crane is performed. Additionally, the present invention includes, for example, stopping the turning operation and the traveling operation in a case where an operator is not touching the manipulating member and the turning operation and the traveling operation of the crane are performed.

According to the present invention, the crane in which the manipulation according to an operator's intention is more easily performed can be provided. In addition, the problems, configurations, and effects other than those described above will be apparent by the following description of the embodiments.

One Embodiment

Hereinafter, embodiments of a crane according to the present invention will be described with reference to the drawings.

Figure 1:
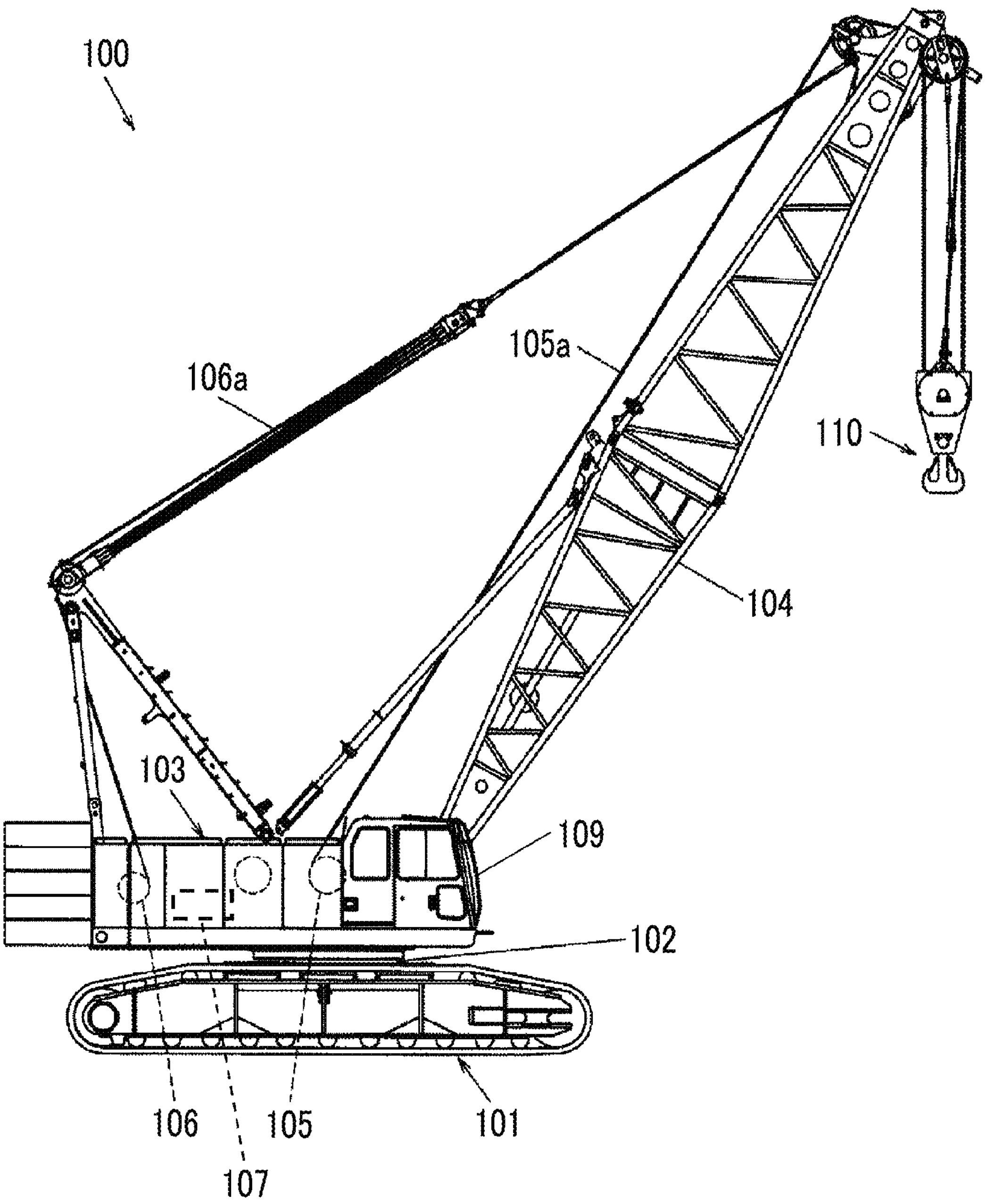
FIG. 1 is a side view of a crane according to an embodiment of the present invention.

FIG. 1 is a side view of a crane 100 according to an embodiment of the present invention. The crane 100 is a crawler crane and includes an undercarriage 101, a turning body 103 turnably provided on the undercarriage via a turning ring 102 and a boom 104 pivotably supported by the turning body 103.

The turning body 103 is provided with a cab 109 and is mounted with a hoisting drum 105 and a derricking drum 106 that are winch devices, in addition to an engine 107 that is a prime mover. A hoisting rope 105*a* is wound around the hoisting drum 105, and the hoisting rope 105*a* is wound or unwound by the drive of the hoisting drum 105, and the hook 110 is lifted and lowered. A derricking rope 106*a* is wound around the derricking drum 106, and the derricking rope 106*a* is wound or unwound by the drive of the derricking drum 106, and the boom 104 is derricked.

The turning body 103 is turnably driven by a turning hydraulic motor 1 (refer to FIG. 5) via the turning ring 102, the hoisting drum 105 is driven by a hoisting hydraulic motor (not shown), and the derricking drum 106 is driven by a derricking hydraulic motor (not shown).

Figure 2:
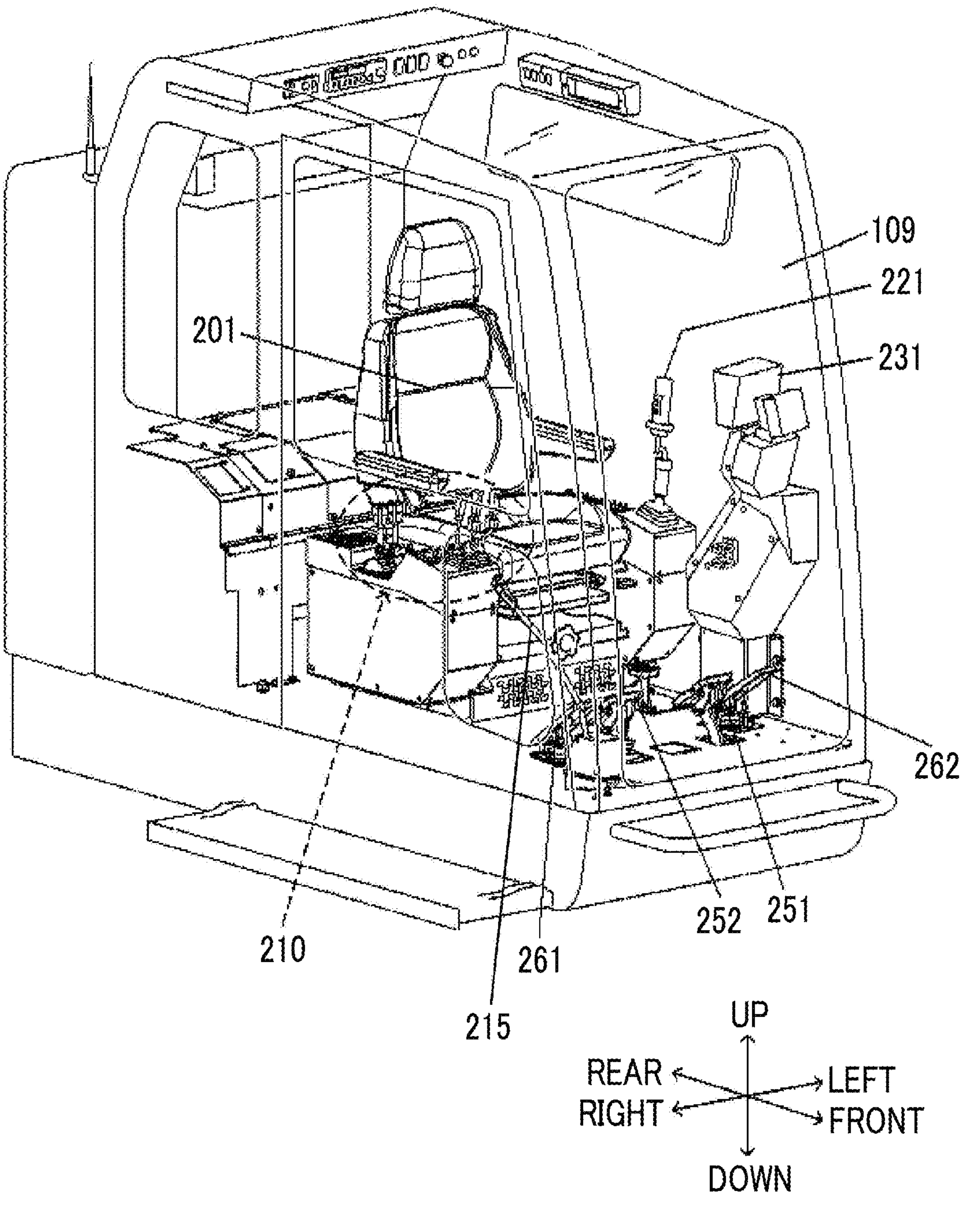
FIG. 2 is a perspective view showing an entire cab.
Figure 3:
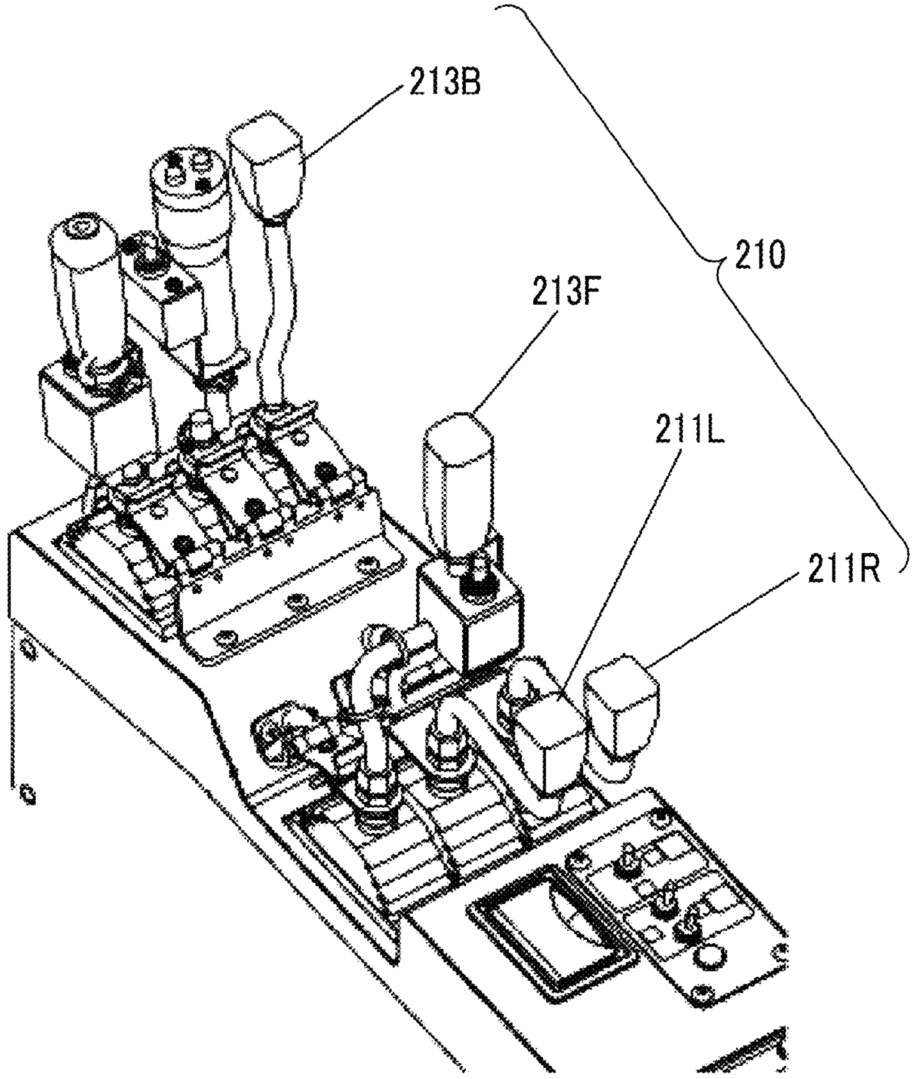
FIG. 3 is a diagram showing a right lever group.
Figure 4:
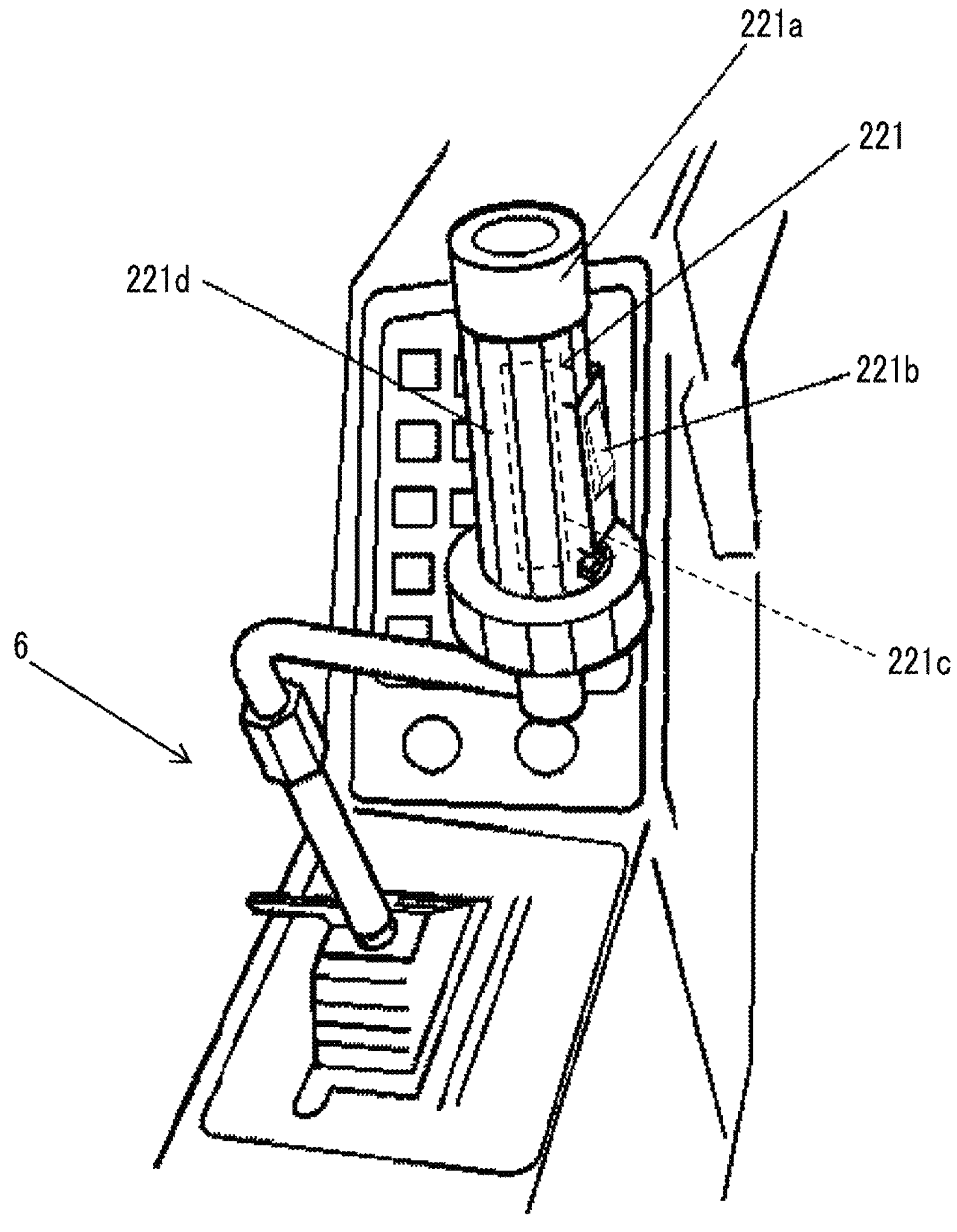
FIG. 4 is a diagram showing a left lever (turning lever).

FIG. 2 is a perspective view showing the entire cab 109, FIG. 3 is a view showing a right lever group 210, and FIG. 4 is a view showing a left lever (turning lever) 221. As shown in FIG. 2, the cab 109 is provided with an operator's seat 201 on which an operator sits, the right lever group 210 manipulated by the operator sitting on the operator's seat 201 with his/her right hand, and the left lever (turning lever) 221 manipulated by the operator sitting on the operator's seat 201 with his/her left hand. Additionally, a display unit 231 is provided on the left front side of the operator's seat 201, and various kinds of information such as the operation state of the crane 100 and warnings are displayed.

A hoisting drum brake pedal 251 for braking the hoisting drum 105, a derricking drum brake pedal 252 for braking the derricking drum 106, an accelerator pedal 261 (manipulating member) for increasing or decreasing the rotational speed of the engine 107, and a turning brake pedal 262 for braking the turning body 103 are provided on the floor of the cab 109.

As shown in FIG. 3, the right lever group 210 includes a pair of traveling levers, that is, a traveling lever 211L for driving a left crawler, a traveling lever 211R for driving a right crawler, and a hoisting winch manipulating lever 213F and a derricking winch manipulating lever 213B.

The traveling levers 211L and 211R are manipulating levers for driving the right and left crawlers by oscillating the traveling levers in a front-rear direction. The traveling lever 211L or 211R has a mechanism for locking the manipulation position (manipulated variables) thereof to a maximum manipulation position. That is, when the operator tilts the traveling levers 211L or 211R to the maximum manipulation position, the traveling of the crane 100 is maintained at a speed according to the maximum manipulation position.

The hoisting winch manipulating lever 213F is a manipulating lever for driving the hoisting drum 105 by oscillating the lever in the front-rear direction. The derricking winch manipulating lever 213B is a manipulating lever for driving the derricking drum 106 by oscillating the lever in the front-rear direction. In addition, the hoisting winch manipulating lever 213F and the derricking winch manipulating lever 213B also have a mechanism, (detent mechanism) for locking the manipulation position.

The left lever, that is, the turning lever 221 (turning manipulating member/manipulating member) is a manipulating lever for turnably driving the turning body 103 by oscillating the lever in the front-rear direction. As shown in FIG. 4, the turning lever 221 has a grip portion 221*d* that is gripped by the operator sitting on the operator's seat 201. The turning lever 221 is provided with an accelerator grip 221*a* (manipulating member), a turning brake switch 221*b*, and a touch sensor 221*c*. In addition, although the turning lever 221 in the present embodiment does not have a mechanism for locking the manipulation position, the turning lever may include a mechanism for locking the turning lever at the maximum position of the turning manipulation, similar to the traveling levers 211L and 211R and the winch manipulating levers 213F and 213E described above.

The accelerator grip 221*a* is a manipulation device for increasing or decreasing the rotational speed of the engine 107 by rotating the accelerator grip clockwise or counterclockwise when viewed from above in a state in which the operator holds the accelerator grip with his/her left hand. The accelerator grip 221*a* is integrated with the turning lever 221 so that the operator can operate the turning lever 221 while manipulating the accelerator grip 221*a* with one hand. In addition, the present embodiment has a configuration in which the rotational speed of the engine 107 can be increased or decreased by manipulating the accelerator pedal 261 in addition to manipulating the accelerator grip 221*a*.

The turning brake switch 221*b* is a switch for selecting whether or not to apply turning braking that holds the turning body 103 so as not to turn. The touch sensor 221*c* is a detection means for determining whether or not the operator is touching the turning lever 221. In addition, as will be described below, the present embodiment has a configuration in which the controller 3 (refer to FIG. 5) applies braking to a predetermined operation of the crane 100 on the basis of the presence or absence of input of a detection signal from the touch sensor 221*c*.

Additionally, as shown in FIG. 2, the cab 109 is provided with a gate locking lever 215. The gate locking lever 215 can be manipulated in the vertical direction between an unlocked position where a gate of the cab 109 is blocked and a lock operation position where the gate of the cab 109 is opened. The gate locking lever 215 disables all manipulations of the crane 100 at the lock operation position. That is, in a case where the gate locking lever 215 is at the lock operation position, all manipulations such as suspension work, traveling manipulation, and turning manipulation of the crane 100 cannot be performed.

Figure 5:
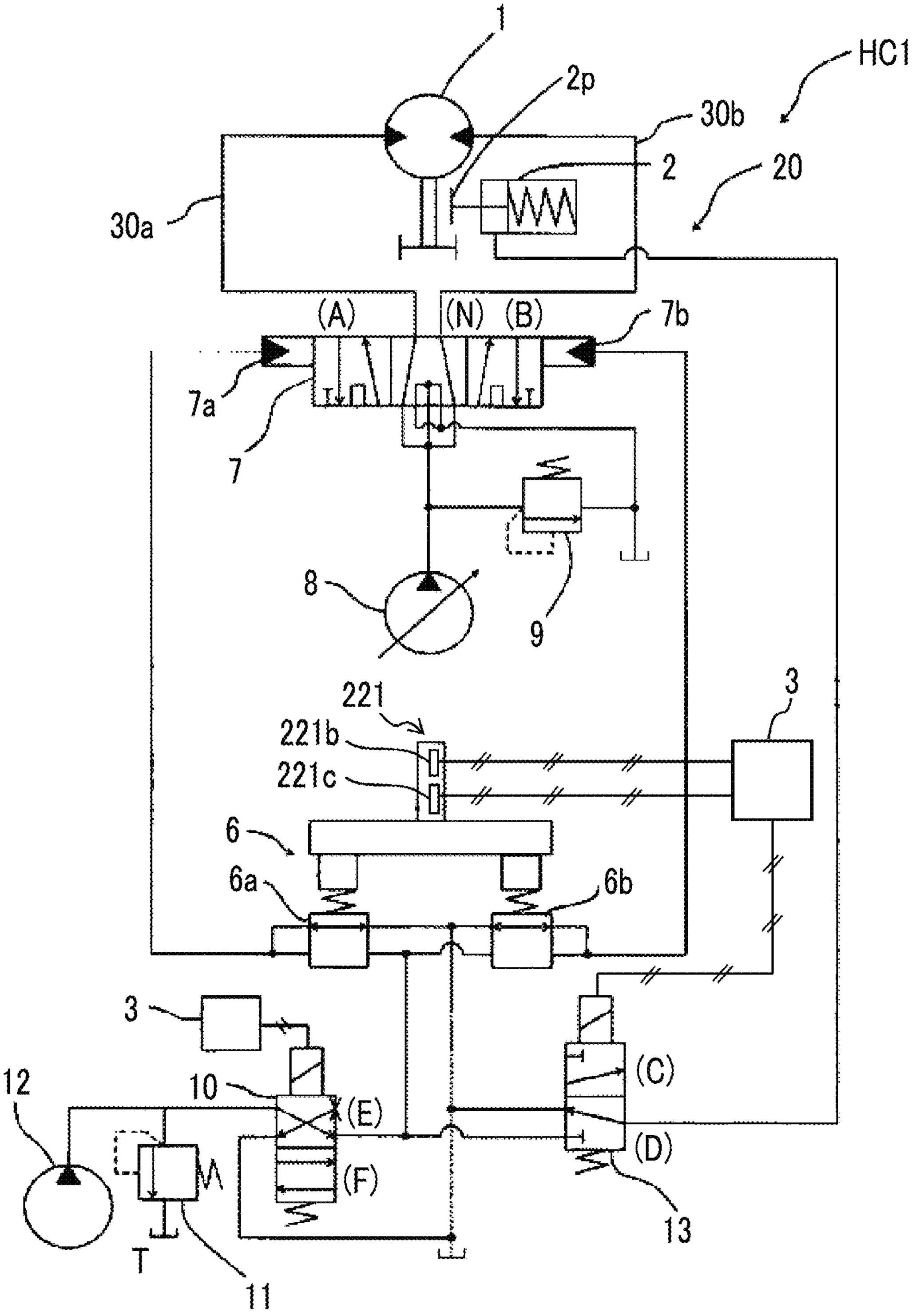
FIG. 5 is a hydraulic circuit diagram for driving a turning hydraulic motor.

Next, a hydraulic drive circuit for driving the turning body 103 of the crane 100 will be described. FIG. 5 is a diagram showing a hydraulic circuit HC1 for driving the turning hydraulic motor 1. As shown in FIG. 5, the hydraulic circuit HC1 is a neutral-free turning hydraulic circuit in which a turning hydraulic pump (hereinafter, simply referred to as a hydraulic pump 8) and a turning hydraulic motor (hereinafter, simply referred to as the hydraulic motor 1) are connected to each other by a direction control valve 7.

The hydraulic circuit HC1 includes a variable capacity type hydraulic pump 8 driven by the engine 107 (refer to FIG. 1), the hydraulic motor 1 rotated by pressure oil discharged from the hydraulic pump 8, a turning brake device 20 that brakes the rotation of the hydraulic motor 1, and a relief valve 9 that regulates the maximum pressure of the pressure oil discharged from the hydraulic pump 8. Additionally, the hydraulic circuit HC1 includes the direction control valve 7 that controls the flow of the pressure oil from the hydraulic pump 8 to the hydraulic motor 1, a pilot pump 12 driven by the engine 107, a turning lever device 6, and a relief valve 11 that regulates the maximum pressure of the pilot pressure oil discharged from the pilot pump 12.

The turning lever device 6 includes the turning lever 221 (refer to FIG. 4) and pilot valves 6*a* and 6*b* connected to the pilot pump 12. The turning lever device 6 is a turning manipulation device that generates a manipulation pi lot pressure for providing an instruction on the turning operation of the turning body 103 by the pilot valves 6*a* and 6*b* depending on the manipulation direction and manipulated variable of the turning lever 221, and outputs the manipulation pilot pressure to pilot pressure input units 7*a* and 7*b* of the direction control valve 7, thereby performing the turning manipulation of the turning body 103.

The hydraulic motor 1 is connected to pipelines 30*a* and 30*b* to which the pressure oil discharged from the hydraulic pump 8 is supplied via the direction control valve 7. The rotation force of the hydraulic motor 1 is transmitted to the turning ring 102 (refer to FIG. 1) via a planetary reduction mechanism (not shown).

The direction control valve 7 is a control valve having a neutral-free position (N) and is inserted into an oil passage between the hydraulic pump 8 and the hydraulic motor 1. The position of a spool of the direction control valve 7 is controlled by the manipulation pilot pressure (the pressure of the pilot pressure oil) generated by the pilot valves 6*a* and 6*b* depending on the manipulation of the turning lever 221 provided in the cab 109.

When the operator operates the turning lever 221 to a normal rotation side, the manipulation pilot pressure output from the pilot valve 6*a* acts on the pilot pressure input unit 7*a* of the direction control valve 7, and the direction control valve 7 is switched to a normal rotation position (A). Accordingly, the pressure oil discharged from the hydraulic pump 8 is supplied to the hydraulic motor 1 via the pipeline 30*b*, the hydraulic motor 1 rotates normally, and the turning body 103 turns in a normal direction (for example, turns left).

When the operator manipulates the turning lever 221 to a reverse rotation side, the manipulation pilot pressure output from the pilot valve 6*b* acts on the pilot pressure input unit 7*b* of the direction control valve 7, and the direction control valve 7 is switched to a reverse rotation position (B) side. Accordingly, the pressure oil discharged from the hydraulic pump 8 is supplied to the hydraulic motor 1 via the pipeline 30*a*, the hydraulic motor 1 rotates reversely, and the turning body 103 turns in a reverse direction (for example, turns right).

When the operator returns the turning lever 221 from a turning manipulation position to a neutral position, the direction control valve 7 is switched to the neutral-free position (N), and the pipeline 30*a* and the pipeline 30*b* are in a communication state. Thus, the hydraulic motor 1 is brought into a rotatable state by receiving an external force. Accordingly, the turning body 103 is brought into a free state in which inertial rotation is possible. This state is also referred to as neutral-free. In a case where the neutral-free state is set, the turning of the turning body 103 can be stopped by operating the turning brake device 20 described below and generating a braking force on the turning body 103.

The turning brake device 20 includes a hydraulic cylinder (hereinafter referred to as a brake release cylinder 2) having a pad 2*p* pressed against a turning brake disc (not shown) provided on an output shaft of the hydraulic motor 1 and a turning brake valve 13 that controls the flow of the pressure oil supplied from the pilot pump 12 to the brake release cylinder 2.

The turning brake device 20 is a so-called negative brake, and in a state in which the brake release cylinder 2 is in communication with a tank, a pad 2*p* is pressed against the turning brake disc (not shown) by a spring force, the turning brake is operated, and a braking force to the turning body 103 is generated. When the release pressure acts on the brake release cylinder 2, the turning brake device 20 is released. Since a gap is formed between the turning brake disc (not shown) and the pad 2*p* in a state in which the turning brake device 20 is released, a braking force to the turning body 103 is not generated.

The turning brake valve 13 is provided between the pilot pump 12 and the brake release cylinder 2. The turning brake valve 13 is an electromagnetic switching valve that allows the flow of the pressure oil from the pilot pump 12 to the brake release cylinder 2 at a release position (C) and prohibits the flow of the pressure oil from the pilot pump 12 to the brake release cylinder 2 at an operation position (D). When the turning brake valve 13 is switched to the operation position (D), the brake release cylinder 2 and the tank communicate with each other, and the pressure in an oil chamber of the brake release cylinder 2 becomes a tank pressure.

The hydraulic circuit HC1 includes a gate lock valve 10 provided between the pilot pump 12 and the pilot valves 6*a* and 6*b*. The gate lock valve 10 is an electromagnetic switching valve that allows the flow of the pressure oil from the pilot pump 12 to the pilot valves 6*a* and 6*b* at a communication position (E) and prohibits the flow of the pressure oil from the pilot pump 12 to the pilot valves 6*a* and 6*b* at a blocking position (F).

The pilot pump 12 is connected to the turning brake valve 13 via the gate lock valve 10. In a case where the gate lock valve 10 is switched to the blocking position (F), even if the turning brake valve 13 is switched to the release position (C), the pressure oil is not supplied to the brake release cylinder 2. Therefore, the turning brake device 20 is brought into an operating state (that is, a state in which a braking force is generated). That is, when the gate lock valve 10 is switched to the blocking position (F), the manipulation of the turning lever 221 is disabled. Also, the turning brake device 20 is released as the gate lock valve 10 is switched to the communication position (E) and the turning brake valve 13 is switched to the release position (C).

The crane 100 includes a controller 3 configured to include a calculation processing device having a CPU, a ROM and RAM that are storage devices, other peripheral circuits, and the like. The controller 3 is a control device that controls respective parts of the crane 100 on the basis of signals from various sensors.

The controller 3 is electrically connected to the turning brake valve 13 and the gate lock valve 10. The controller 3 is electrically connected to the turning brake switch 221*b* provided on the turning lever 221 and switches the turning brake valve 13 to the release position (C) or the operation position (D) on the basis of a signal from the turning brake switch 221*b*. Additionally, the controller 3 switches the gate lock valve 10 to the communication position (E) or the blocking position (F) on the basis of the manipulation of the gate locking lever 215 (refer to FIG. 2) provided in the cab 109.

More specifically, when the turning brake switch 221*b* is manipulated to an OFF (closed) position, a current is supplied from a power supply (not shown) of the controller 3 to a solenoid of the turning brake valve 13 and the solenoid is excited to switch the turning brake valve 13 to the release position (C). When the turning brake switch 221*b* is manipulated to an ON (open) position, the supply of the current from the power supply of the controller 3 (not shown) to the solenoid of the turning brake valve 13 is cut off, and the solenoid is demagnetized to switch the turning brake valve 13 to the operation position (D) by a spring force.

When the gate locking lever 215 is manipulated to the unlocked position, a current is supplied from the power supply (not shown) of the controller 3 to the solenoid of the gate lock valve 10, and the solenoid is excited to switch the gate lock valve 10 to the communication position (E). When the gate locking lever 215 is manipulated to the lock operation position, the supply of the current from the power supply of the controller 3 (not shown) to the solenoid of the gate lock valve 10 is cut off, and the solenoid is demagnetized (non-excited) to switch the gate lock valve 10 to the blocking position (F) by the spring force.

In addition, although not shown in FIG. 5, the gate lock valve 10 is also provided between the pilot pump 12, and the traveling levers 211L and 211R, the hoisting winch manipulating lever 213F, and the derricking winch manipulating lever 213B. For that reason, all manipulations such as suspension work, traveling manipulation, and turning manipulation of the crane 100 are disabled in a state in which the gate locking lever 215 is in the lock operation position. That is, in the present embodiment, all the operations of the crane 100 are stopped as the gate lock valve 10 is switched to the blocking position (F) by the controller 3. In this way, the gate lock valve 10 has a function of stopping manipulations to respective actuators (the hydraulic motor 1, the hoisting hydraulic motor, the derricking hydraulic motor, the traveling motor, and the like) that performs the operation of the crane 100, that is, a function of simultaneously stopping the respective operations of the crane 100.

Moreover, in the present embodiment, the touch sensor 221*c* provided on the turning lever 221 and the controller 3 are electrically connected to each other. The controller 3 controls to stop the predetermined operation of the crane 100 on the basis of the presence or absence of the detection signal input from the touch sensor 221*c*.

Figure 6:
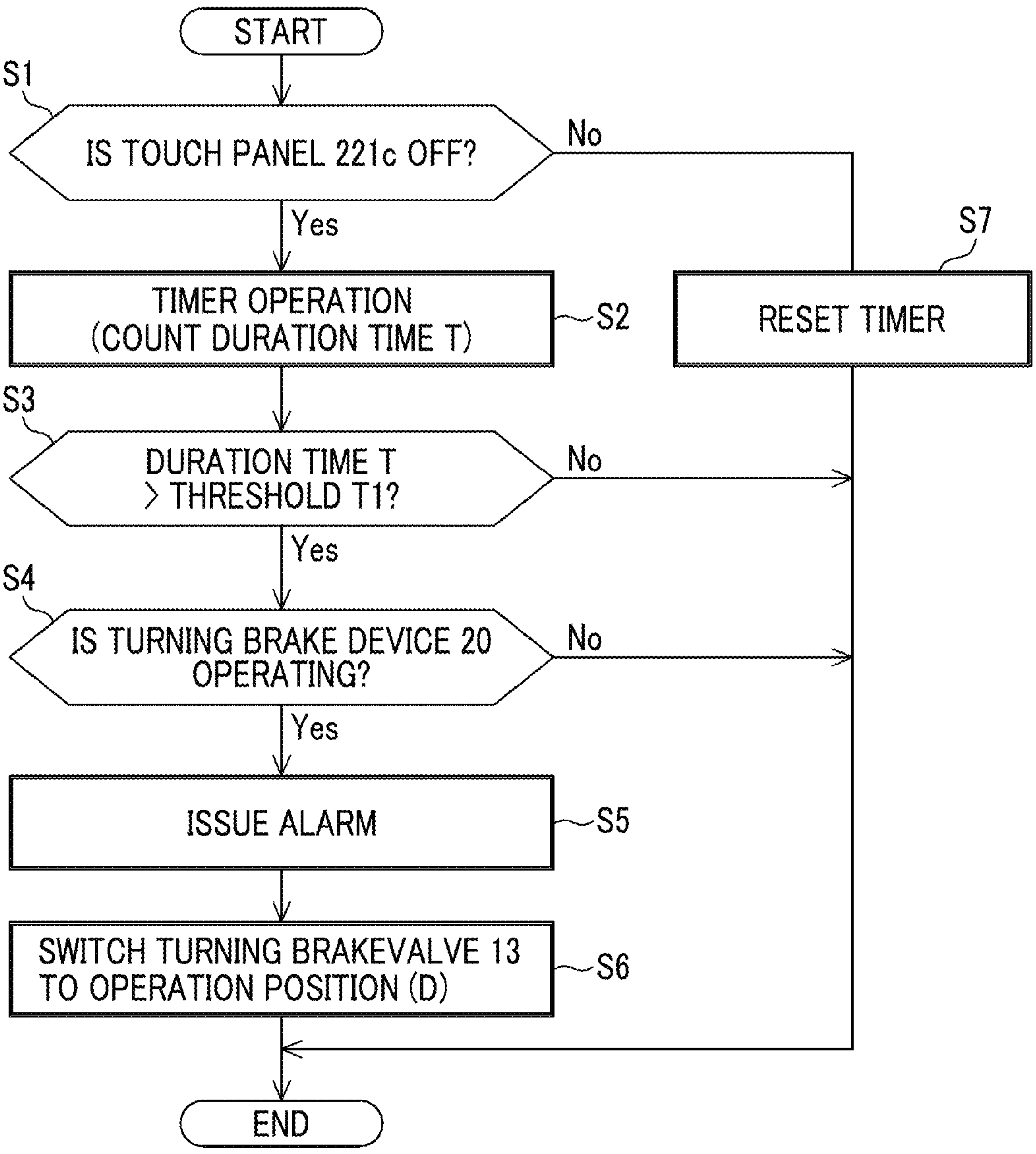
FIG. 6 is a flowchart showing a processing procedure of controlling the stop of the crane.

Hereinafter, the control for stopping the operation of the crane 100 will be described. FIG. 6 is a flowchart showing a processing procedure of controlling the stop of the crane 100 by the controller 3. In addition, the processing shown in FIG. 6 is started when a key switch of the engine 107 is turned on, and is repeatedly executed in a predetermined cycle (for example, every several tens of milliseconds).

As shown in FIG. 6, the controller 3 constantly monitors the detection signal of the touch sensor 221*c*, and in a case where the touch sensor 221*c* is OFF, that is, in a case where there is no input of the detection signal from the touch sensor 221*c* (S1/Yes), the controller 3 determines that the operator has not touched the turning lever 221 to operate a timer. Then, the controller 3 counts a duration time T of an OFF state of the touch sensor 221*c* (S2).

Next, the controller 3 determines whether or not the duration time T exceeds a threshold T1. Here, the threshold T1 is optionally set in consideration of the manipulability of the crane 100. In the present embodiment, for example, the threshold T1 is set to 5 seconds.

In a case where the controller 3 determines that the duration time T exceeds the threshold T1 (S3/Yes), the controller 3 determines whether or not the turning brake device 20 is operating (S4). Specifically, the controller 3 determines whether or not the turning brake valve 13 is at the operation position (D).

In a case where the controller 3 determines that the turning brake device 20 is operating (S4/Yes), that is, in a case where the turning brake valve 13 is at the release position (C), the controller 3 issues an alarm (S5). Specifically, the controller 3 displays a warning on the display unit 231 and emits a warning sound from a speaker. Then, the controller 3 switches the turning brake valve 13 to the operation position (D) (S6). In this way, the turning operation (predetermined operation) of the crane 100 is stopped.

In addition, in a case where the touch sensor 221*c* is ON (S1/No), the controller 3 resets the timer and ends the processing (S7). Additionally, in a case where the duration time T does not exceed the threshold T1 (S3/No) and in a case where the turning brake device 20 is not operating (S4/No), the controller 3 also ends the processing.

As described above, according to the present embodiment, the turning operation is stopped in a case where the operator is not touching the turning lever 221 and the crane 100 is in the turning operation (in the case of a specific state). Therefore, the crane in which the manipulation according to the operator's intention is more easily performed can be provided. Moreover, since the turning brake device 20 operates in a case where a state in which the operator does not touch the turning lever 221 continues during a predetermined time (5 seconds), the work efficiency does not decrease. That is, in the present embodiment, both excellent crane manipulation and improved work efficiency can be achieved.

Additionally, since the alarm is issued before the turning operation is stopped (S5), it is possible to urge the operator's attention to stop, and the manipulation according to the operator's intention is more easily performed.

Additionally, even in a case the operator momentarily releases the turning lever 221, if the turning lever 221 is gripped before the predetermined time elapses, the timer is reset (processing of S1/No, S7). Therefore, an alarm is issued, and the turning brake device 20 does not operate. Thus, a decrease in work efficiency is prevented.

Moreover, in the present embodiment, a neutral-free hydraulic circuit configuration is provided. Therefore, the inertial operation can be used during the turning manipulation, and manipulation can be performed without shock such that the shaking of a suspended cargo and a load applied to the boom 104 do not increase. On the other hand, if a state in which the operator does not try to use the inertial operating using the neutral-free, that is, the operator does not touch the turning lever 221 continues, the turning brake device 20 operates (S6). Therefore, the manipulation according to the operator's intention is more easily performed.

Here, a configuration may be adopted in which, in a case where the time when the turning lever 221 is not touched exceeds the threshold T1 (S3/Yes), the controller 3 monitors the state of the traveling motor instead of operating the turning brake device 20 to stop the turning operation, and in a case where the controller 3 determines that the traveling motor is operating, the controller 3 brakes the traveling motor to stop the traveling operation (predetermined operation) of the crane 100.

Specifically, in S4, the controller 3 determines whether or not the traveling motor is operating on the basis of a signal from a rotation speed sensor provided on a drive shaft of the traveling motor, a speed sensor of the crane 100, or the like. In a case where the controller 3 determines that the traveling motor is operating in S4, the controller 3 controls to stop the rotation of the traveling motor in S6 after issuing an alarm (S5).

According to this configuration, the traveling operation is stopped in a case where the turning lever 221 is untouched and in a case where the crane 100 is in the traveling operation (predetermined operation). Thus, since the turning lever 221 is not touched, it is possible to realize a crane in which the manipulation according to the operator's intention that there is no intention to manipulate the crane 100 is more easily performed.

Moreover, in the present embodiment, the traveling levers 211L and 211R are configured to be lockable at the predetermined manipulation positions as described above. Therefore, the traveling manipulation can be performed without keeping holding the traveling levers 211L and 211R. In this state, for example, the traveling operation can be stopped by releasing the hand from, the turning lever 221 and bringing the turning lever 221 into an untouched state. Therefore, it is possible to realize a crane that is easier to operate according to the operator's intention that the crane 100 is not intended to be manipulated because the turning lever 221 is not touched.

Another Embodiment

Figure 7:
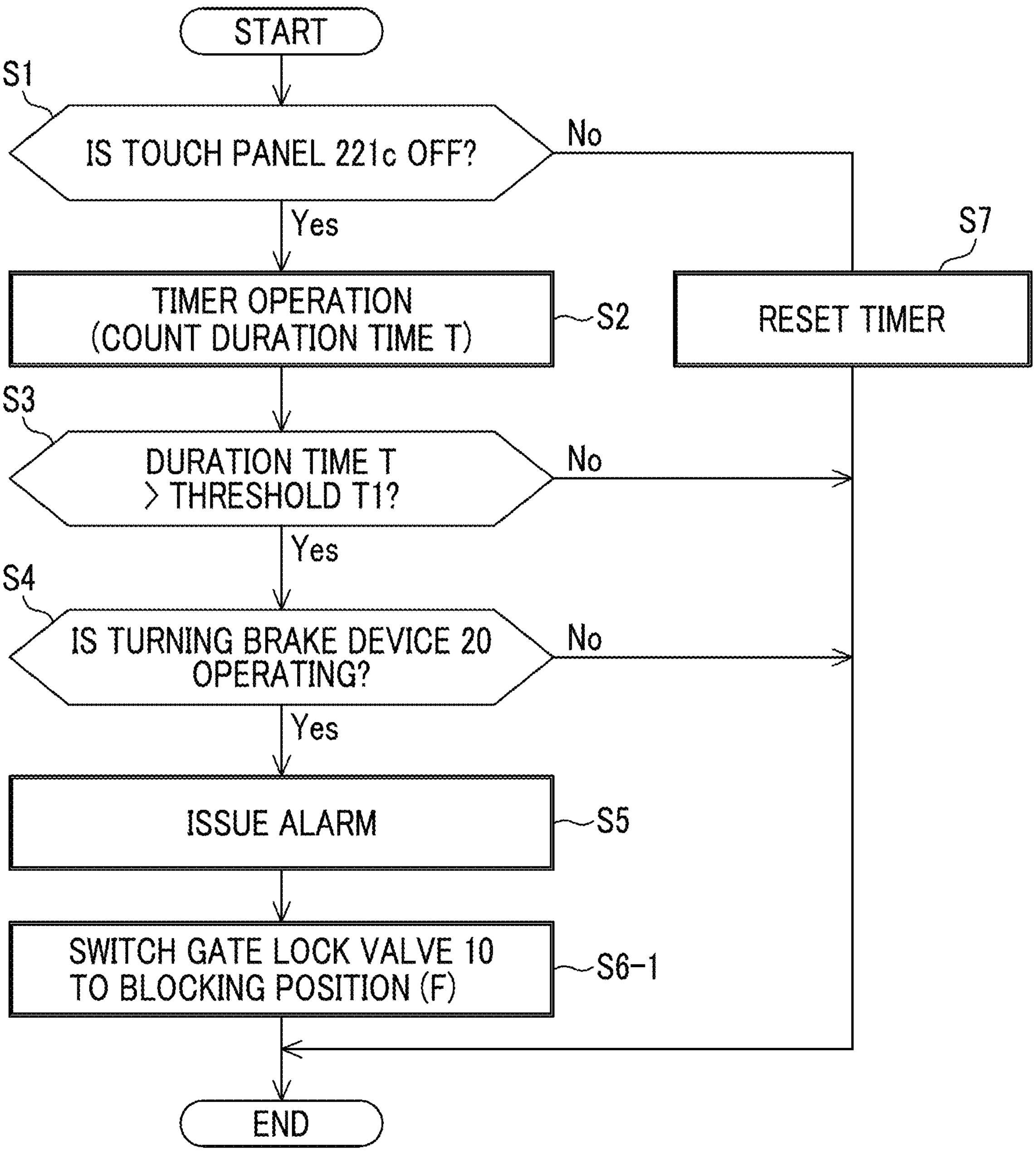
FIG. 7 is a flowchart showing a processing procedure of controlling the stop of a crane according to another embodiment.

FIG. 7 is a flowchart showing a processing procedure of controlling the stop of a crane according to another embodiment. As shown in FIG. 7, the other embodiment has a feature in that the controller 3 switches the gate lock valve 10 instead of the turning brake valve 13 to the blocking position (F) (S6-1) to operate the turning brake device 20.

When the gate lock valve 10 is switched to the blocking position (F) in S6-1, the pressure oil is not supplied to the brake release cylinder 2. Therefore, the turning brake device 20 is brought into an operating state (that is, a state in which a braking force is generated). Even in this configuration, the same effects as those of the one embodiment can be exhibited.

Moreover, when the gate lock valve 10 is switched to the blocking position (F), the traveling levers 211L and 211R, the hoisting winch manipulating lever 213F, and the derricking winch manipulating lever 213B cannot be simultaneously manipulated. For that reason, even in a case where the traveling operation (second predetermined operation) or the rotational operation of the winch is performed during the turning operation (during the first predetermined operation), the control of stopping these operations is performed in parallel, and the respective operations stop almost simultaneously. Thus, according to the other embodiment, higher manipulability can be realized.

In addition, instead of the configuration in which the gate lock valve 10 is switched to the blocking position (F), a configuration in which the traveling motor and the winch drive motor are individually braked may be adopted.

Further Embodiment

Figure 8:
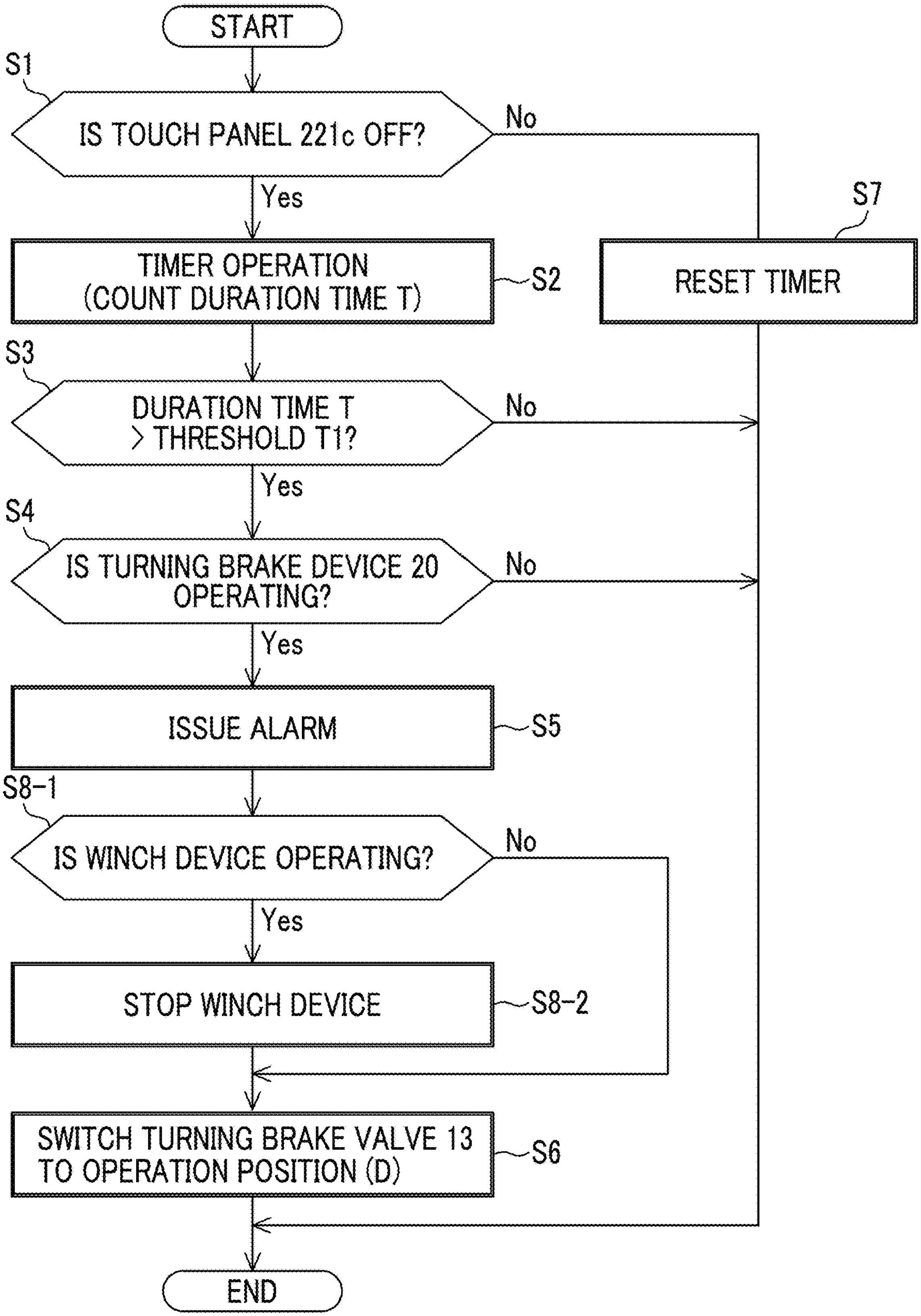
FIG. 8 is a flowchart showing a processing procedure of controlling the stop of a crane according to further embodiment.

FIG. 8 is a flowchart showing a processing procedure of controlling the stop of a crane according to further embodiment. In the further embodiment, as shown in FIG. 8, the controller 3 determines whether or not the winch device (the hoisting drum 105 or the derricking drum 106) is operating (S8-1). Specifically, the controller 3 determines whether or not the hoisting winch manipulating lever 213F or the derricking winch manipulating lever 213B is manipulated. Then, in a case where the winch device is operating (S8-1/Yes), the controller 3 stops the operation of the winch device before switching the turning brake valve 13 (S8-2). That is, the controller 3 stops the rotational driving of the hydraulic motor that rotates the hoisting drum 105 or the derricking drum 106.

Even in this configuration, the same effects as those of the one embodiment can be exhibited. Additionally, since the control of stopping the suspension work is performed before the control of stopping the turning operation is performed, the stop of the turning operation can be more smoothly performed, and more excellent manipulability can be realized.

Still Another Embodiment

Figure 9:
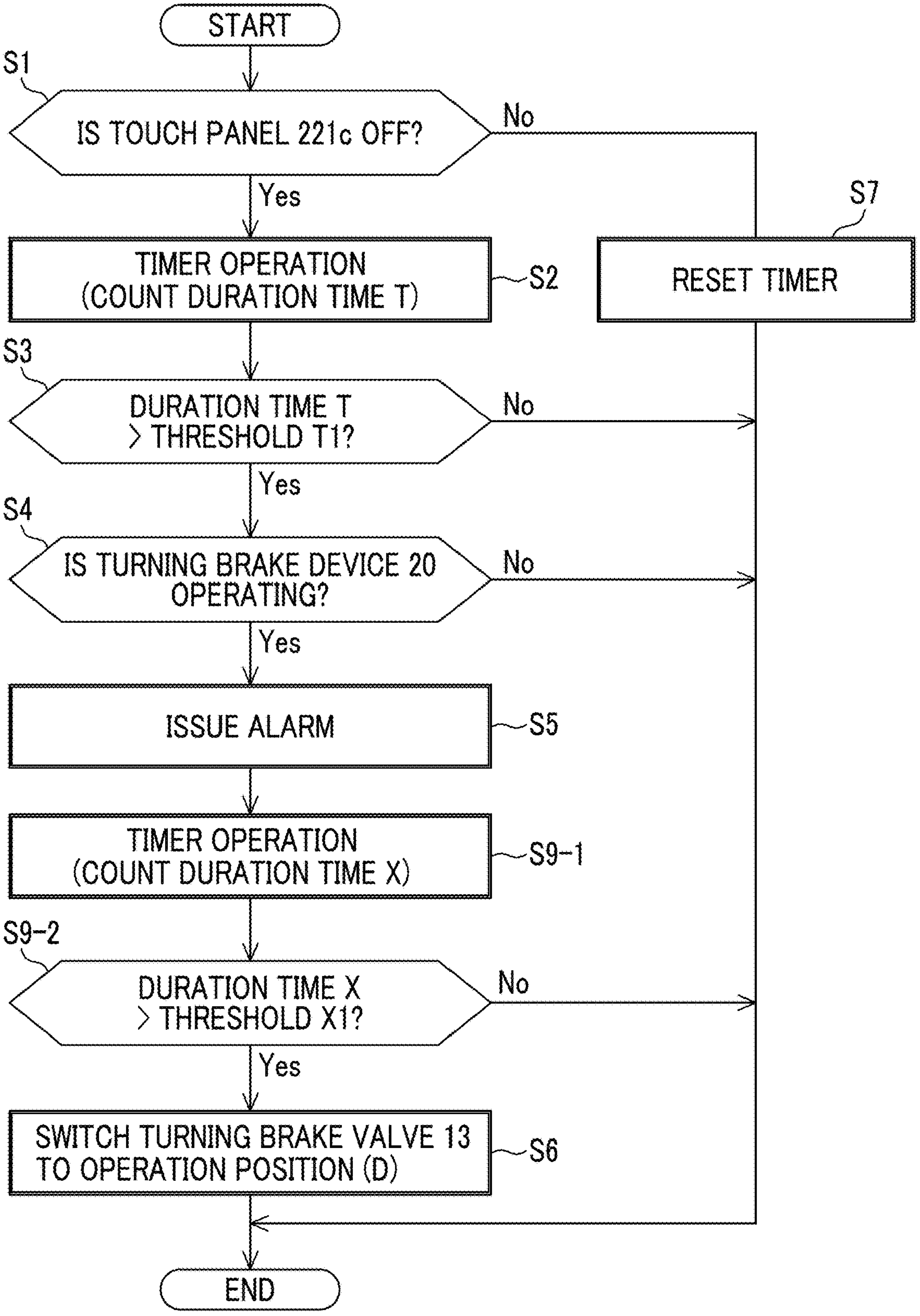
FIG. 9 is a flowchart showing a processing procedure of controlling the stop of a crane according to still another embodiment.

FIG. 9 is a flowchart showing a processing procedure of controlling the stop of a crane according to still another embodiment. The flowchart shown in FIG. 9 is for realizing a control in which the crane operation is not immediately stopped in a case where an alarm issuance is different from the operator's intention.

As shown in FIG. 9, when an alarm is issued (S5), the timer is operated and the counting of an alarm time X is started (S9-1). Then, in a case where the alarm time X exceeds a threshold X1 (for example, 5 seconds), the controller 3 switches the turning brake valve 13 to the operation position (D) and stops the turning operation position (S6). On the other hand, in a case where the alarm time X is equal to or less than the threshold X1 (predetermined time), the controller 3 ends the processing.

According to this configuration, when an alarm is issued and the operator manipulates the turning lever 221 again within the threshold X1, at the time of the next processing of this flowchart, the answer is No in the determination of S1, the timer is reset (S7), and the issuance of the alarm is stopped. As a result, the turning manipulation of the crane 100 is maintained (returned) without switching the turning brake valve 13 to the operation position (D).

According to this configuration, for example, in a case where an alarm is issued by the operator accidentally releasing his/her hand from the turning lever 221, if the operator immediately touches the turning lever 221, the turning manipulation is continued. Therefore, excellent turning manipulation can be realized. In addition, the threshold X1 (predetermined time) is not limited to 5 seconds. The threshold X1 is appropriately determined in consideration of manipulability.

References to Other Embodiments

In addition, the present invention is not limited to the aforementioned embodiment, and various modifications can be made without departing from the concept of the present invention, and all technical matters included in the technical idea described in the claims are included are the subject of the present invention. Although the above-mentioned embodiment shows a preferred example, those skilled in the art can realize various alternatives, alternations, modifications, or improvements from the contents disclosed in the present specification. These are included in the technical concept described in the appended claims.

For example, in each of the above-described embodiments, an example in which the touch sensor 221*c* s used to detect a state in which the operator is not touching the turning lever 221 has been described, but the present invention is not limited to the configuration using the touch sensor 221*c*. For example, a state in which the operator is not touching the turning lever 221 may be detected by using all means such as a limit switch, an optical sensor, and a camera instead of the touch sensor 221*c*.

Additionally, usually, the manipulation frequency of the turning lever 221 is high in the operation of the crane. Therefore, in each of the above-described embodiments, whether or not the touch sensor 221*c* is OFF (processing of S1) is detected so that the predetermined operation of the crane 100 (the turning operation or the like) is stopped. However, instead of this configuration, for example, whether or not the operator is touching the accelerator grip 221*a* or the accelerator pedal 261 (manipulating member) in which the manipulation frequency is high similarly may be detected so that the predetermined operation of the crane 100 is stopped. Additionally, instead of this, whether or not the operator is touching the traveling levers 211L and 211R may be detected so that the predetermined operation of the crane 100 is stopped.

Additionally, although the configuration is exemplified in which the control of stopping the suspension work is performed before the control of stopping the turning operation is performed (refer to FIG. 8), a configuration may be adopted in which the turning operation is stopped before the control of stopping the turning operation is performed in a case where the turning operation and the traveling operation are performed. Additionally, a configuration may be adopted in which the suspension work and the traveling operation are performed before the turning operation in a case where the turning operation, the suspending work, and the traveling operation are simultaneously performed.

In addition, in the present embodiment, an example in which the traveling operation is stopped in a case where the turning lever 221 is not touched and the crane 100 is in the traveling operation (predetermined operation) and an example in which the turning operation is stopped in a case where the operator is not touching the turning lever 221 and the crane 100 is in the turning operation (in the case of a specific state) are shown, the crane 100 may include both of the two stop controls or may have only any one. Additionally, the predetermined operation of the crane may be an operation other than the traveling or turning operation.

Additionally, a crawler crane has been exemplified as an example of the crane. However, the present invention is not limited to this and can be applied to all kinds of cranes such as tower cranes, ceiling cranes, jib cranes, retractable cranes, stacker cranes, portal cranes, unloaders, and other basic machines such as earth drills, in addition to other mobile cranes such as wheel cranes, truck cranes, rough terrain cranes, and all terrain cranes.

It should be understood that the invention is not limited to the above-described embodiment, but may be modified into various forms on the basis of the spirit of the invention. Additionally, the modifications are included in the scope of the invention.

What is claimed is:

1. A crane comprising:

an undercarriage;

a turning body turnably provided on the undercarriage;

a boom pivotably supported by the turning body;

a first manipulating lever configured to perform both an accelerator manipulation for increasing or decreasing a rotational speed of an engine and a turning manipulation of the turning body; and a second manipulating lever that is separate from the first manipulating lever and configured to perform a manipulation different from the accelerator manipulation and the turning manipulation of the turning body, wherein in a case where an operator is not touching the first manipulating lever, and a predetermined operation of the crane using the second manipulating lever is being performed, the predetermined operation using the second manipulating lever is stopped.

2. The crane according to claim 1, wherein the first manipulating lever is a turning manipulating lever configured to perform at least the turning manipulation, the second manipulating lever is a traveling manipulating lever configured to perform at least a traveling operation, and in a case where the operator is not touching the turning manipulating lever, and the traveling operation as the predetermined operation of the crane is being performed, the traveling operation is stopped.

3. The crane according to claim 1, wherein the first manipulating lever is a turning manipulating lever configured to perform at least the turning manipulation, the turning body is configured to be rotatable with inertia when the turning manipulating lever is at a neutral position, and in a case where the turning manipulating lever is at the neutral position, the operator is not touching the turning manipulating lever, and a turning operation as the predetermined operation of the crane is being performed, the turning operation is stopped.

4. The crane according to claim 1, wherein the second manipulating lever which is configured to perform the predetermined operation is lockable in a case where the second manipulating lever is located at a predetermined manipulation position.

5. The crane according to claim 1, further comprising:

a controller, wherein the crane performs a plurality of kinds of the predetermined operations by manipulating the first manipulating lever or the second manipulating lever by the operator, and in case of a specific state in which the operator is not touching the first manipulating lever and a first predetermined operation among the predetermined operations is being performed, the first predetermined operation is stopped by the controller and a second predetermined operation among the predetermined operations is also stopped by the controller.

6. The crane according to claim 5, wherein the first predetermined operation is a turning operation of the turning body, and the second predetermined operation is a traveling operation of the undercarriage.

7. The crane according to claim 5, further comprising:

a plurality of actuators configured to perform the predetermined operations, wherein in a case of the specific state, the controller controls each actuator to stop the first predetermined operation in parallel with the second predetermined operation.

8. The crane according to claim 7, wherein the controller controls at least one valve to allow a flow of pressure oil at a communication position and prohibit the flow of the pressure oil at a blocking position, by controlling the actuators.

9. The crane according to claim 5, wherein in a case of the specific state, the second predetermined operation is stopped by the controller before stopping the first predetermined operation.

10. The crane according to claim 9, wherein the first predetermined operation is a turning operation of the turning body, and the second predetermined operation is a rotational operation of a winch of the crane.

11. The crane according to claim 1, wherein an alarm is issued by displaying a warning on a display or emitting a warning sound from a speaker in a case where the operator is not touching the first manipulating lever and the predetermined operation of the crane using the second manipulating lever is being performed, and the predetermined operation is stopped after a controller determines whether or not the predetermined operation is performed during a predetermined time, and the predetermined operation continues in a case where the operator touches the first manipulating lever for the predetermined time.

12. The crane according to claim 1, further comprising:

a right lever group that is manipulated by the operator with his/her right hand, wherein the right lever group includes a traveling lever, a hoisting winch manipulating lever, and a derricking winch manipulating lever, and the second manipulating lever is included in the right lever group.

13. The crane according to claim 12, wherein the traveling lever is locked in a case where the traveling lever is located at a maximum manipulation position.

14. The crane according to claim 1, wherein in a state where the operator is touching the first manipulating lever, in a case where the second manipulating lever directs a command for a predetermined operation of the crane and the predetermined operation of the crane using the second manipulating lever is performed, the predetermined operation is continuable.

15. The crane according to claim 14, wherein the first manipulating lever is a turning manipulating lever configured to perform at least an accelerator manipulation and a turning manipulation, the second manipulating lever is a traveling manipulating lever configured to perform at least a traveling operation, in a case where the operator is not touching the turning manipulating lever and the traveling operation as the predetermined operation of the crane is being performed, the traveling operation is stopped, and in a state where the operator is touching the turning manipulating lever, in a case where the second manipulating lever directs the command for a predetermined operation of the crane and the predetermined operation of the crane using the second manipulating lever is being performed, the predetermined operation is continuable.

16. The crane according to claim 14, wherein the first manipulating lever is disposed on one side of left and right sides of the operator, and the second manipulating lever is disposed on the other side of the operator.

17. The crane according to claim 1, wherein the first manipulating lever is a turning manipulating lever configured to perform at least the turning manipulation, the second manipulating lever is configured to perform at least a manipulation for a derricking operation or a hoisting operation of the crane, and in a case where the operator is not touching the first manipulating lever and a predetermined operation of the crane comprising the derricking operation or the hoisting operation is being performed, the derricking operation or the hoisting operation is stopped, and subsequently, a turning operation is stopped.

18. The crane according to claim 1, further comprising:

a gate locking lever, wherein all manipulations are disabled in a case where the gate locking lever is disposed at a predetermined position.

* * * * *